US011005908B1

(12) United States Patent
Wu et al.

(10) Patent No.: US 11,005,908 B1
(45) Date of Patent: May 11, 2021

(54) SUPPORTING HIGH EFFICIENCY VIDEO CODING WITH HTTP LIVE STREAMING

(71) Applicant: Amazon Technologies, Inc., Seattle, WA (US)

(72) Inventors: Yongjun Wu, Bellevue, WA (US); Jake O'Halloran, Seattle, WA (US); Sriram Divakar, Shoreline, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/709,558

(22) Filed: Dec. 10, 2019

(51) Int. Cl.
| | |
|---|---|
| H04L 29/06 | (2006.01) |
| H04N 21/24 | (2011.01) |
| H04N 21/2187 | (2011.01) |
| H04N 21/2662 | (2011.01) |
| H04N 21/84 | (2011.01) |

(52) U.S. Cl.
CPC ......... *H04L 65/608* (2013.01); *H04L 65/607* (2013.01); *H04N 21/2187* (2013.01); *H04N 21/2662* (2013.01); *H04N 21/84* (2013.01)

(58) Field of Classification Search
None
See application file for complete search history.

(56) References Cited

U.S. PATENT DOCUMENTS

| | | | |
|---|---|---|---|
| 9,686,332 B1 | 6/2017 | Binns et al. | |
| 10,277,924 B1 | 4/2019 | Stewart et al. | |
| 10,313,722 B1 | 6/2019 | Searl et al. | |
| 2013/0067052 A1* | 3/2013 | Reynolds ........... | H04N 21/2668 709/223 |
| 2014/0379871 A1* | 12/2014 | Van Brandenburg ....................... | H04L 65/1069 709/219 |
| 2017/0272485 A1* | 9/2017 | Gordon ................. | H04L 65/601 |
| 2017/0359628 A1* | 12/2017 | Sachdev ............. | H04N 21/812 |
| 2018/0020246 A1* | 1/2018 | Harrison ............. | H04L 65/4069 |
| 2019/0146951 A1* | 5/2019 | Velmurugan ......... | H04N 21/84 707/822 |

OTHER PUBLICATIONS

K. Durak, M. N. Akcay, Y. K. Erinc, B. Pekel and A. C. Begen, "Evaluating the Performance of Apple's Low-Latency HLS," 2020 IEEE 22nd International Workshop on Multimedia Signal Processing (MMSP), Tampere, 2020, pp. 1-6, doi: 10.1109/MMSP48831.2020.9287117. (Year: 2020).*

\* cited by examiner

Primary Examiner — Natisha D Cox
(74) Attorney, Agent, or Firm — Weaver Austin Villeneuve & Sampson LLP

(57) ABSTRACT

Methods and apparatus are described by which media player functionality such as, for example, adaptive bitrate selection may be supported in media players on iOS, tvOS, or MacOS devices for video content encoded using the HEVC codec. Each video segment reference in the manifest includes two associated HLS-compliant tags, a discontinuity tag followed by a map segment tag.

20 Claims, 3 Drawing Sheets

SUPPORTING HIGH EFFICIENCY VIDEO CODING WITH HTTP LIVE STREAMING

BACKGROUND

HTTP Live Streaming (HLS) is a widely used media streaming protocol for delivering audio and video content over the internet. Apple's iOS, tvOS, and MacOS devices employ HLS to stream video content. As part of acquiring a stream of video content, an iOS, tvOS, or MacOS device requests a manifest (also referred to as a playlist) that includes descriptions of the video content, including URLs at which segments of the content can be obtained.

Video segments encoded according to the Advanced Video Coding (AVC) codec (also referred to as H.264) typically include all of the initialization metadata and parameter sets necessary for a decoder on a client device to properly decode the segments for playback. This information enables media players on client devices to support functionality such as adaptive bitrate selection because the decoder can be reconfigured on the fly using the available initialization metadata and parameter sets at any point within a media presentation.

By contrast, video segments encoded according to the more recent High Efficiency Video Coding (HEVC) codec (also referred to as H.265) do not include the initialization metadata and parameter sets. Instead, this information is provide using an out-of-band mechanism (e.g., a separate initialization segment in the manifest). iOS, tvOS, or MacOS devices employing HLS configure their decoders for HEVC content using the information in the separate initialization segment. What this means is that the media services from other providers can no longer support features such as adaptive bitrate algorithms for HEVC content based on the assumption that initialization metadata and parameter sets will be available with each video segment.

DETAILED DESCRIPTION

Figure 1:
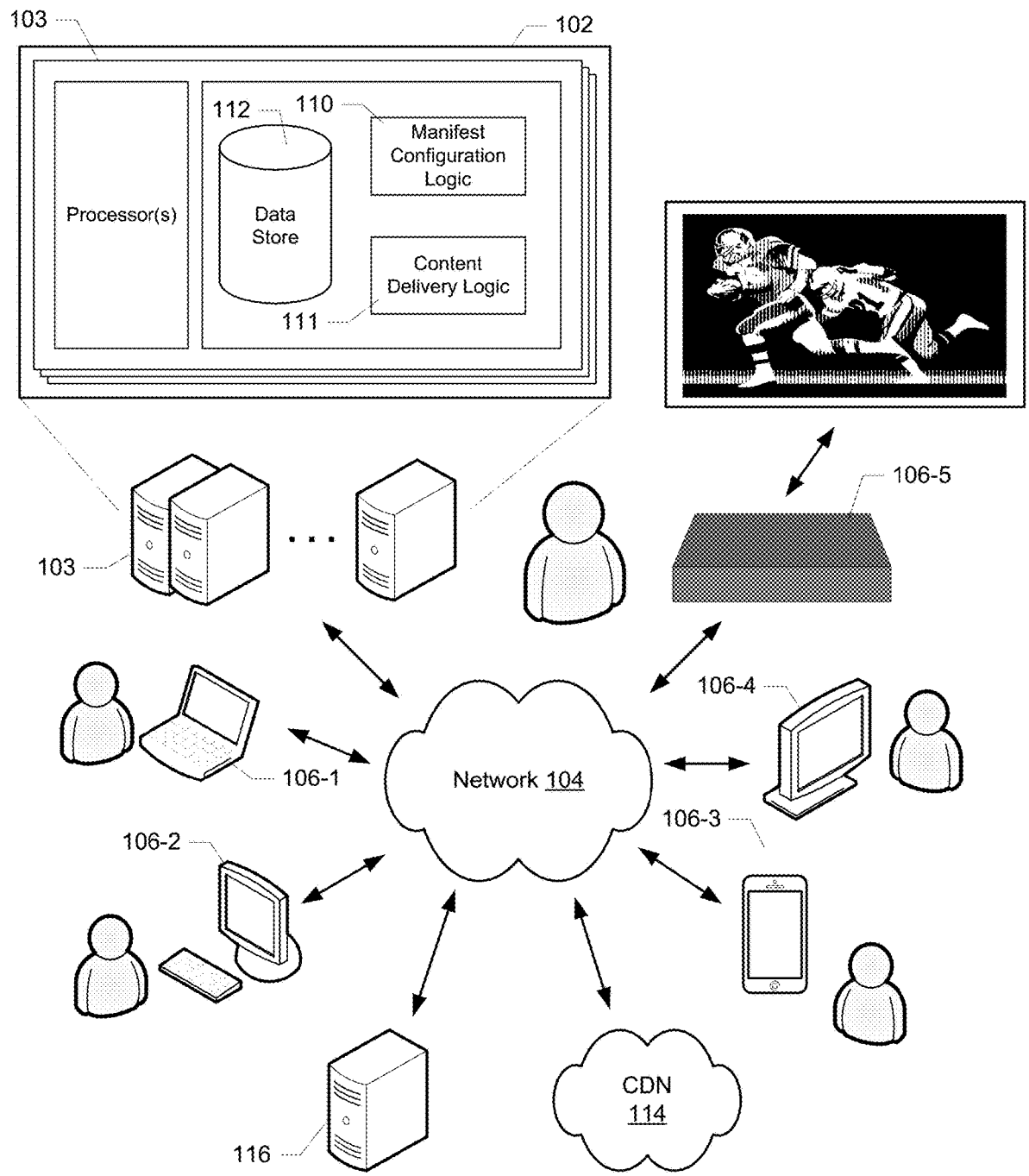
FIG. 1 illustrates an example of a computing environment in which various implementations may be practiced.

This disclosure describes techniques by which functionality such as, for example, adaptive bitrate selection may be supported for media players on iOS, tvOS, and MacOS devices for video content encoded using the HEVC codec and the fragmented MP4 file format (fMP4, also referred to as the Common Media Application Format or CMAF). According to a particular class of implementations, each video segment reference in the manifest provided to a media player on an iOS, tvOS, or MacOS device includes two associated HLS-compliant tags, a discontinuity tag (EXT-X-DISCONTINUITY) followed by a map segment tag (EXT-X-MAP); the latter providing the initialization metadata and parameter sets appropriate for the video segment with which it is associated, and the former notifying the media player of a discontinuity in the video content. An example will be instructive.

An HLS-compliant manifest includes references to the different components of a media presentation (e.g., video, audio, subtitles). Sequence numbers and presentation times are represented for the video component of the presentation along with the references to the particular video segments. An HLS-compliant media player uses this information to construct requests for the video segments. The EXT-X-DISCONTINUITY tag conventionally enables switching between content streams (e.g., as part of a failover or insertion of secondary content). The presence of an EXT-X-DISCONTINUITY tag indicates a discontinuity to the HLS-compliant media player and the fact that the presentation time of the last video segment preceding the discontinuity will not be contiguous with the presentation time of the first segment following the discontinuity. The media player uses this information to handle the discontinuity and render the stream correctly.

Because it is HLS-compliant, a media player operating on an iOS, tvOS, or MacOS device would respond accordingly to the EXT-X-DISCONTINUITY tag for each video segment it selects from the manifest, potentially resulting in reconfiguration of the device's decoder using the information in the EXT-X-MAP tag if the corresponding video segment corresponds to a different bitrate variant than the previously selected video segment. As will be appreciated, this allows a third-party adaptive bitrate algorithm to operate with the media player without requiring that initialization metadata and parameter sets be provided with each video segment delivered to the decoder. In other words, a media player on an iOS, tvOS, or MacOS device can be fully HLS-compliant while supporting adaptive bitrate selection for HEVC content. Other functionality that may be supported in this way include, for example, CDN failover and traffic allocation, and content-adaptive encoding. Other codecs that may be supported in this way include, for example, AOMedia Video 1 (AV1) encoding and Versatile Video Coding (VVC).

According to some implementations, enhanced content logic is provided that may be integrated with or implemented separately from the native media player of the device. This logic (which may be on the iOS, tvOS, or MacOS device or hosted on a remote device) includes a manifest generation service that provides HLS-compliant manifests generated as described herein to the native media player on the client device. The enhanced content logic has an associated web server that hosts the master manifest and performs manifest manipulation using the master manifest to provide a subset of the master manifest to the native media player on the client. This logic may also include adaptive bitrate (ABR) logic configured to translate requests from the native media player to select the appropriate bitrate variant using the master manifest. Additional information about such an approach to manifest generation is provided in U.S. Pat. No. 9,686,332 entitled Live Stream Manifests for On-Demand Content issued Jun. 20, 2017, the entire disclosure of which is incorporated herein by reference for all purposes.

FIG. 1 illustrates an example of a computing environment in which video streams may be transmitted for streaming playback via network 104 to a variety of viewer devices (106-1 through 106-5) in accordance with the techniques described herein. Service 102 may conform to any of a wide variety of architectures such as, for example, a services platform deployed at one or more co-locations, each implemented with one or more servers 103 having one or more processors (e.g., central processing units (CPUs), graphic processing units (GPUs), tensor processing units (TPUs), etc.). Network 104 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, and so on. Viewer devices 106 may be any suitable iOS, tvOS, or MacOS device capable of connecting to network 104 and consuming content streams. Such devices may include, for example, mobile devices (e.g., cell phones, smart phones, tablets, and the like), personal computers (e.g., laptops and desktops), set top boxes (e.g., for cable, satellite, and online systems), smart televisions, gaming consoles, wearable computing devices (e.g., smart watches or smart glasses), internet-connected cameras, voice-activated smart home devices (e.g., with integrated personal digital assistants), etc.

At least some of the examples described herein contemplate implementations based on computing models that enable on-demand network access to a shared pool of computing resources (e.g., networks, servers, storage, applications, and services). As will be understood, such computing resources may be integrated with and/or under the control of the same entity controlling service 102. Alternatively, such resources may be independent of service 102, e.g., on a platform under control of a separate provider of services and/or computing resources with which service 102 connects to consume resources as needed.

It should be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

It should also be noted that implementations are contemplated in which, in addition to manifest configuration logic 110 for generating and/or obtaining manifest data for media content, service 102 may include other types of logic, such as content delivery logic 111, along with other logic (not shown) involved in delivery of media content for streaming playback of media content (e.g., control plane logic, data plane logic, Digital Rights Management, secondary content insertion, device proxies, URL vending services, video back ends, transformation scripts, etc.).

In addition to information for configuring manifest data, service 102 may also include a variety of information related to the video content (e.g., other associated metadata and manifests in data store 112 which service 102 uses, or to which service 102 provides access or transmits to viewer devices 106). In some cases, any of the information in data store 112 may be provided and/or hosted by one or more separate platforms, e.g., CDN 114 or other intermediate or third-party platform 116. It should be noted that, while logic 110 and 111, and data store 112 are shown as integrated with service 102, implementations are contemplated in which some or all of these operate remotely from the associated service, and/or are under the control of an independent entity. Those of skill in the art will understand the diversity of use cases to which the techniques described herein are applicable.

Figure 2:
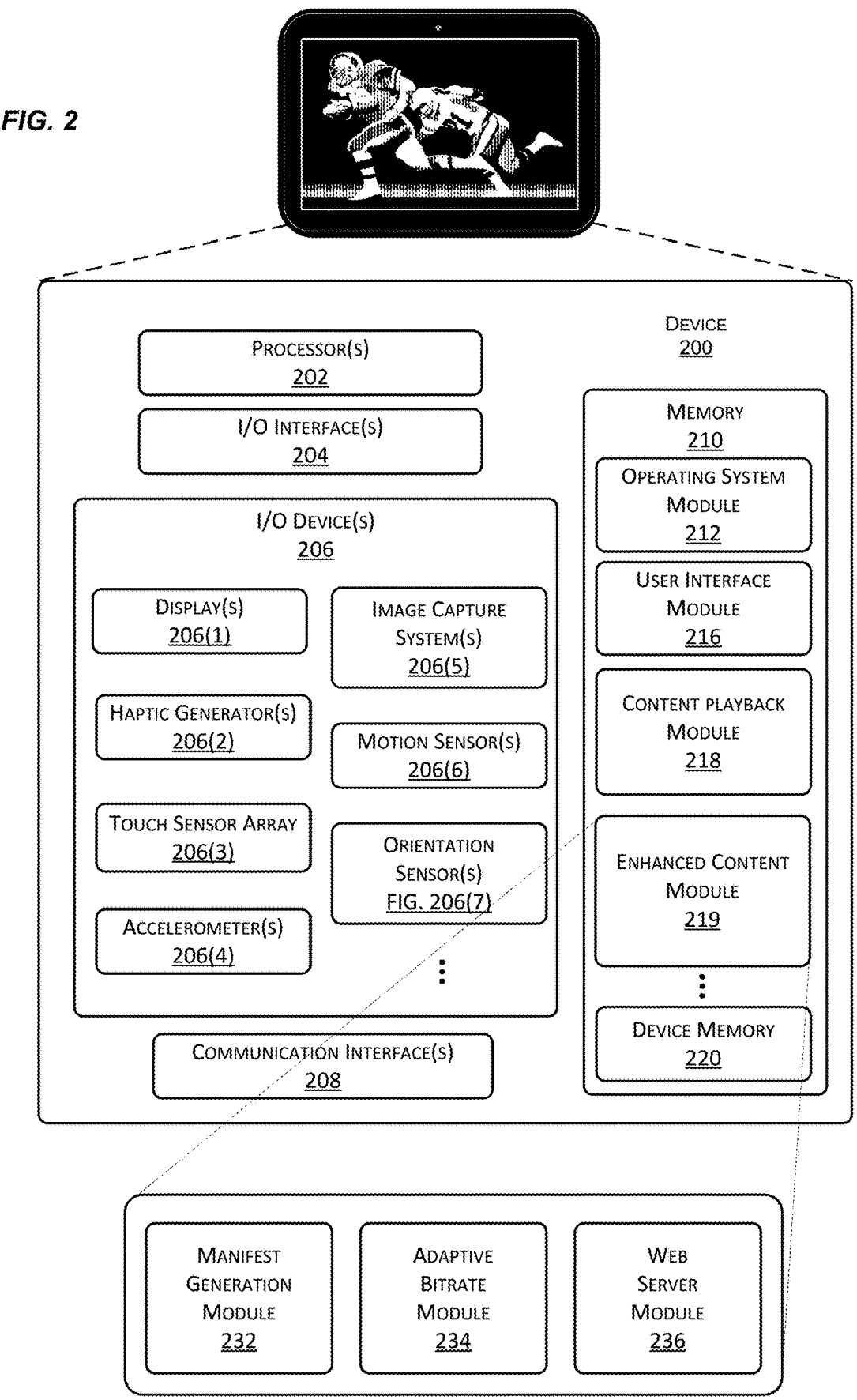
FIG. 2 is an example of a client device in which various implementations may be practiced.

A block diagram of an example of an iOS, tvOS, or MacOS client device 200 suitable for use with various implementations is shown in FIG. 2. As mentioned above, it should be understood that device 200 may be any of a wide variety of device types. Device 200 (depicted as a tablet device) includes one or more single or multi-core processors 202 configured to execute stored instructions (e.g., in device memory 220). Device 200 may also include one or more input/output (I/O) interface(s) 204 to allow the device to communicate with other devices. I/O interfaces 204 may include, for example, an inter-integrated circuit (I2C) interface, a serial peripheral interface (SPI) bus, a universal serial bus (USB), an RS-232 interface, a media device interface (e.g., an HDMI interface), and so forth. I/O interface(s) 204 is coupled to one or more I/O devices 206 which may or may not be integrated with client device 200.

Device 200 may also include one or more communication interfaces 208 configured to provide communications between the device and other devices. Such communication interface(s) 208 may be used to connect to cellular networks, personal area networks (PANs), local area networks (LANs), wide area networks (WANs), and so forth. For example, communications interfaces 208 may include radio frequency modules for a 2G or 4G cellular network, a WiFi LAN and a Bluetooth PAN. Device 200 also includes one or more buses or other internal communications hardware or software (not shown) that allow for the transfer of data and instructions between the various modules and components of the device.

Device 200 also includes one or more memories (e.g., memory 210). Memory 210 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 210 provides storage for computer readable instructions, data structures, program modules and other data for the operation of device 200. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 210 includes at least one operating system (OS) module 212 (e.g., Apple's iOS, tvOS, or MacOS) configured to manage hardware resources such as I/O interfaces 204 and provide various services to applications or modules executing on processor(s) 202. Memory 210 also includes a user interface module 216, a content playback module 218, and other modules. Memory 210 also includes device memory 220 to store a wide variety of instructions and information using any of a variety of formats including, for example, flat files, databases, linked lists, trees, or other data structures. Such information includes content for rendering and display on display 206(1) including, for example, any type of video content. In some implementations, a portion of device memory 220 may be distributed across one or more other devices including servers, network attached storage devices, and so forth.

Client-side logic used for enhanced content functionality (e.g., processing manifest data, ABR, etc.) generated as described herein (represented by 219 in FIG. 2) may be implemented in a variety of ways, e.g., in hardware, software, and/or firmware. For example, at least some of this functionality may be implemented as part of the code of media player 218 operating on device 200. Alternatively, module 219 may be implemented separately from and interact with the device's media player, web browser, mobile app, decoder, etc. According to a particular implementation, module 219 is implemented separately from the device's native media player and includes manifest generation module 232, ABR module 234, and web server module 236.

And as mentioned above, implementations are contemplated in which much of the logic or computer program instructions enabled by the present disclosure may reside on a separate platform, e.g., service 102, CDN 114, server 116, etc. Such logic may work in conjunction with client-side logic to support functionality enabled by the present disclosure. Suitable variations and alternatives will be apparent to those of skill in the art. It will also be understood that device 200 of FIG. 2 is merely an example of a device with which various implementations enabled by the present disclosure may be practiced, and that a wide variety of other devices types may also be used (e.g., devices 106-1 to 106-5). The scope of this disclosure should therefore not be limited by reference to device-specific details.

Figure 3:
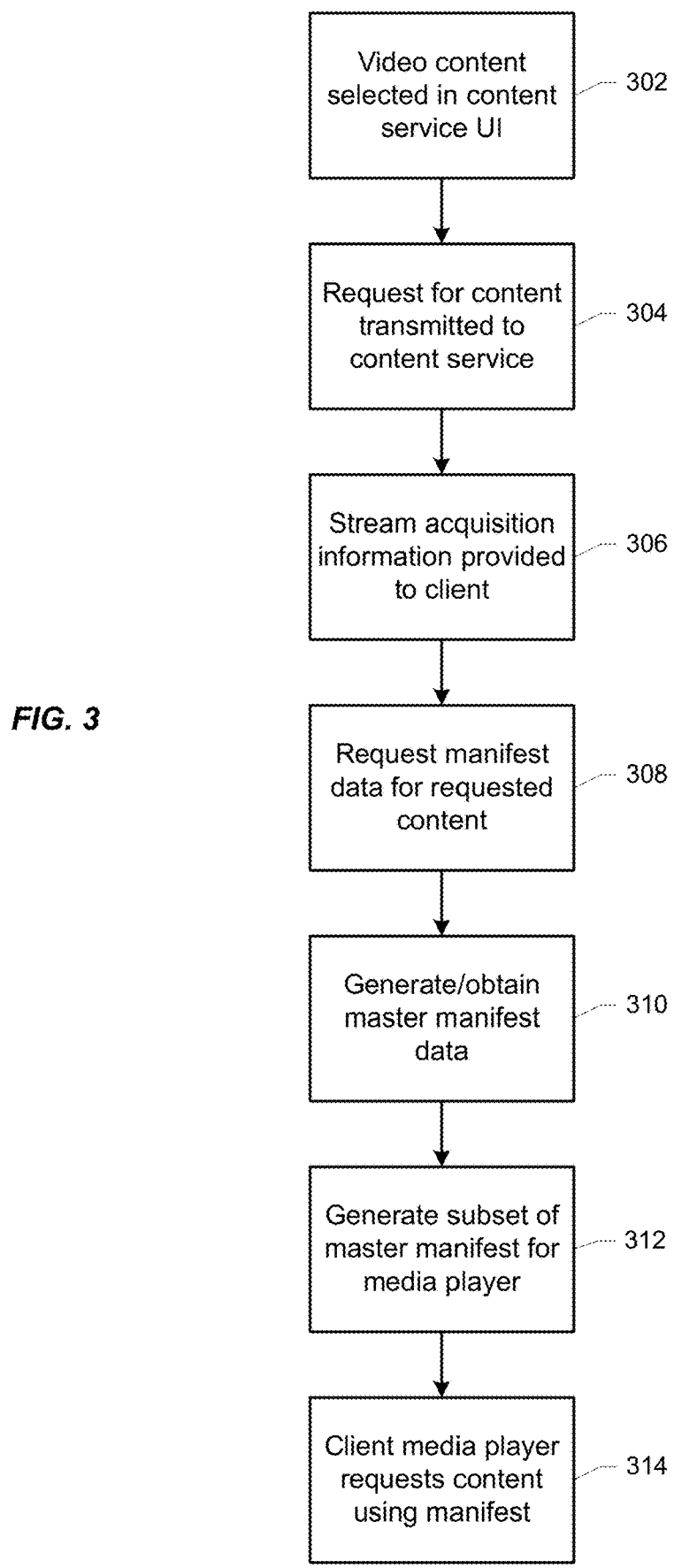
FIG. 3 is a flowchart illustrating operation of a particular class of implementations.

Operation of a particular implementation will now be described with reference to the flowchart of FIG. 3. The depicted implementation assumes an HLS-compliant media player on a client device that employs Apple's iOS, tvOS, or MacOS operating system. The depicted implementation also assumes that the video content is encoded as a number of bitrate variants using the HEVC codec.

When video content is selected in a user interface of a media player on an iOS, tvOS, or MacOS client device (302), a request for the content is sent to the corresponding content service (304). The content service provides the client device with the information the client device needs to download the content or to acquire a stream of the content (306). This may include, for example, DRM licenses, a decryption key, and content metadata. According to implementations enabled by the present disclosure, the content service also provides a manifest or playlist the client can use to generate requests for segments of the selected content.

In some implementations, the content service or enhanced content logic on the client requests the manifest data for the requested content from a manifest service (308). The manifest service generates or obtains master manifest data that describe all of the bitrate variants for the requested content (310). The content service or the enhanced content logic on the client provides a subset of the master manifest to the media player on the requesting client device (312). As will be described in further detail, the manifest data provided to the media player includes HLS tags that enable the support of functionality such as adaptive bitrate selection for the HEVC content. The media player on the client device then uses the manifest data to request segments of the content for playback (314).

For video-on-demand (VOD) content, the master manifest for the entire media presentation may be available when the initial request for the content is made, and so the manifest data provided to the client may cover the entire duration of the media presentation. By contrast, for live, live linear, or broadcast content, the master manifest may be generated in real time as segments of the content become available. In such cases, the manifest data is typically provided to the client as a sequence of updates. In some cases, manifest for VOD content might also be delivered in portions in a sequence of updates or communications. In some cases, this may require some level of synchronization between manifest generation and the segment requests. Nevertheless, in either the case of live content or VOD content, the manifest data may be provided to the client device in accordance with the techniques described herein.

According to various implementations enabled by the present disclosure, the manifest data provided to the native media player on the client device includes an EXT-X-DISCONTINUITY tag and an EXT-X-MAP tag for each segment reference in the manifest. A representative portion of the manifest data might include the following information for each segment:

Segment 0001
EXT-X-DISCONTINUITY tag
EXT-X-MAP tag
Segment URL
Segment 0002
EXT-X-DISCONTINUITY tag
EXT-X-MAP tag
Segment URL
Segment 0003
EXT-X-DISCONTINUITY tag
EXT-X-MAP tag
Segment URL
. . .

As discussed above, the EXT-X-DISCONTINUITY tag indicates a discontinuity in the content that is recognized by the HLS-compliant media player, indicating to the media player a potential change in the manner in which the associated segment may be decoded and displayed, e.g., that the media timeline can change, the video encoding can change, etc. This discontinuity allows the media player to consume a new EXT-X-MAP segment and re-initialize the decoder using the decoder initialization metadata and parameter sets specified in the EXT-X-MAP tag.

Support for adaptive bitrate selection may be provided in a variety of ways depending on the implementation. For example, the subset of the master manifest provided to the client device might include references to segments for multiple bitrate variants, with an adaptive bitrate algorithm associated with the media player selecting from among the available variants for any given duration of content based on, for example, available network bandwidth or device resources.

In other cases, the subset of the master manifest might only include references to segments of a single bitrate variant. In such implementations, when the adaptive bitrate algorithm of the media player attempts to select a different variant, a new subset of the master manifest for the new variant may be provided to the media player (e.g., as a manifest update). In either case, because each segment of content is accompanied by an EXT-X-DISCONTINUITY tag and a corresponding EXT-X-MAP tag, the decoder will be appropriately configured to handle decoding of the corresponding content segment regardless of the bitrate variant to which it belongs.

According to some implementations, the native media player of the client device (e.g., module 218 of FIG. 2) receives a subset of the master manifest that only represents one variant of the content. In such implementations, manifest generation logic (e.g., module 232 of FIG. 2) receives segment requests from the media player and translates those requests using the master manifest data which may be remotely hosted or locally hosted (e.g., module 236 of FIG. 2). Such translation might be done to support particular functionality such as, for example, CDN failover or adaptive bitrate selection (e.g., module 234 of FIG. 2). And because of the presence of the EXT-X-DISCONTINUITY tag in the manifest used by the native media player, the media player is ready to consume a new EXT-X-MAP segment and re-initialize the decoder using the specified decoder initialization metadata and parameter sets.

In some cases, the repeated use of the EXT-X-DISCONTINUITY tag for live content might result in the client playhead (i.e., the content segment currently being rendered and displayed by the client) being delayed further and further from the live playhead (i.e., the most recently available segment of the live content). This is due to the fact that bitrate variants representing the same live content are independently encoded and so may not be aligned in time. Therefore, when switching between variants as described herein, there is potential for the client playhead of the device to drift from the live playhead. This drift could potentially increase with each transition from one variant to another so that the client playhead gets too far behind the live playhead. This might occur, for example, for a broadcast content channel that operates 24 hours a day, seven days a week. Therefore, according to some implementations, the extent of this drift may be monitored and, if larger than some programmable threshold, measures can be taken to move the client playhead closer to the live playhead. For example, if the drift gets too large and therefore too far behind the live playhead, one or more content segments can be skipped to allow the client playhead to "catch up" to the live playhead.

Alternatively, more precise approaches to skipping content may be employed to reduce the visual perceptibility of the transition. For example, the frame rate with which the media player plays back the content might be slightly increased to gradually catch up to the live playhead.

Additional detail regarding reducing the delay between live and client playheads caused by discontinuities in the content is provided in U.S. Pat. No. 10,277,924 entitled Stitching Content Streams Together issued on Apr. 30, 2019, the entire disclosure of which is incorporated herein by reference for all purposes.

In some cases, the repeated use of the EXT-X-DISCONTINUITY tag for live content might result in an increasing lack of synchronization between the audio and video components of a media presentation. That is, video segment can be generated with exact durations (e.g., 2 seconds). However, audio sampling techniques do not always allow for audio segments to be generated at durations that match the exact duration of the video segments. Because the durations of video segments and audio segments are different, an increasingly apparent delay may occur between audio and video during playback as a result of frequent switching between bitrate variants as enabled by the present disclosure. Therefore, some implementations allow for removal of audio content frames to resynchronize audio and video content before the delay interferes with the playback experience.

For example, the manifest data provided to the client device could be generated to include references to only one of two versions of an audio segment that refer to substantially similar audio content. One version is an unaltered audio segment (e.g., with a complete sampling pattern), and the other version having a frame removed from the end. Selection of audio segment references for inclusion in a manifest may be done with reference to the potential delay between the audio and video during playback. If it is determined that the delay might exceed a threshold that represents when a user might perceive a lack of synchronization between audio and video during playback (e.g. 12.5 milliseconds), one or more of the shorter audio segment versions could be selected for the manifest to reduce the delay.

Additional detail regarding handling the lack of synchronization between audio and video that might be caused by discontinuities in the content is provided in U.S. Pat. No. 10,313,722 entitled Synchronizing Audio Content and Video Content issued on Jun. 4, 2019, the entire disclosure of which is incorporated herein by reference for all purposes.

According to some implementations, providing manifests to the native media player on the client device may be synchronized with changes in bitrate by an adaptive bitrate algorithm operating on the client device. That is, each time the adaptive bitrate algorithm determines that a change in bitrate is warranted, a new manifest or a manifest update can be provided to the media player. The new manifest data would include a new EXT-X-MAP tag with the appropriate initialization metadata and parameter sets for the new bitrate variant, allowing for reconfiguration of the decoder without the use of the EXT-X-DISCONTINUITY tag. As will be appreciated, this approach avoids potential delay and synchronization issues that might otherwise arise.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
receiving a request for video content from a media player operating on a client device employing the iOS, tvOS, or MacOS operating system, the media player being compliant with the HTTP Live Streaming (HLS) protocol, the video content being encoded according to the High Efficiency Video Coding (HEVC) codec;
providing manifest data to the media player, the manifest data being HLS-compliant and including references to each of a plurality of video segments of the video content, each of the video segments corresponding to one of a plurality of bitrate variants of the video content, multiple bitrate variants being represented in the manifest data, wherein each reference has an EXT-X-DISCONTINUITY tag and an EXT-X-MAP tag associated therewith, the EXT-X-MAP tag specifying initialization metadata and parameter sets configured for use by a decoder on the client device, the initialization metadata and parameter sets corresponding to the variant of the video content to which the video segment associated with the reference corresponds; and
facilitating access by the media player to selected video segments of the plurality of video segments based on requests from the media player generated using the manifest data and an adaptive bitrate algorithm employed by the media player.

2. The method of claim 1, wherein the video content comprises video-on-demand (VOD) content, live content, live linear content, or broadcast content.

3. The method of claim 1, wherein the manifest data represent a full duration of the video content.

4. The method of claim 1, wherein providing the manifest data to the media player includes providing portions of the manifest data to the media player in a sequence of separate communications.

5. A computer-implemented method, comprising:
receiving a request for media content from a media player operating on a client device, the media player being compliant with a streaming protocol;
providing manifest data to the media player, the manifest data including references to each of a plurality of media segments of the media content, each reference having a first tag and second tag associated therewith, the first tag and the second tag being compliant with the streaming protocol, the first tag representing a discontinuity in the media content in accordance with the streaming protocol, the second tag representing decoder configuration data for use by a decoder on the client device; and
facilitating access to the media content by the media player in response to requests from the media player generated using the manifest data.

6. The method of claim 5, wherein the client device employs the iOS, tvOS, or MacOS operating system, the media player is compliant with the HTTP Live Streaming (HLS) protocol, and the video content is encoded according to the High Efficiency Video Coding (HEVC) codec, and wherein the first tag is an EXT-X-DISCONTINUITY tag and the second tag is an EXT-X-MAP tag.

7. The method of claim 5, wherein the media content comprises on-demand content, live content, live linear content, or broadcast content.

8. The method of claim 5, wherein the manifest data represent a full duration of the media content.

9. The method of claim 5, wherein providing the manifest data to the media player includes providing portions of the manifest data to the media player in a sequence of separate communications.

10. The method of claim 5, wherein each of the media segments of the media content corresponds to one of a plurality of bitrate variants of the media content, and wherein multiple bitrate variants are represented in the manifest data.

11. The method of claim 5, wherein the media segments include video segments and audio segments, and wherein at least some of the references to the audio segments refer to audio segments from which one or more audio frames have been removed.

12. The method of claim 5, wherein facilitating access to the media content by the media player includes enabling the media player to skip one or more of the media segments during playback of the media content if a client playhead associated with the client device falls behind a live playhead associated with the media content more than a threshold amount.

13. A device, comprising memory and one or more processors configured to:
generate a request for media content using a media player operating on the device, the media player being compliant with a streaming protocol;
obtain a master manifest for the media content;
generate manifest data using the master manifest, the manifest data including references to each of a plurality of media segments of the media content, each reference having a first tag and second tag associated therewith, the first tag and the second tag being compliant with the streaming protocol, the first tag representing a discontinuity in the media content in accordance with the streaming protocol, the second tag representing decoder configuration data for use by a decoder on the device; and
generate requests for the media segments using the media player and the manifest data.

14. The device of claim 13, wherein the device employs the iOS, tvOS, or MacOS operating system, the media player is compliant with the HTTP Live Streaming (HLS) protocol, and the video content is encoded according to the High Efficiency Video Coding (HEVC) codec, and wherein the first tag is an EXT-X-DISCONTINUITY tag and the second tag is an EXT-X-MAP tag.

15. The device of claim 13, wherein the media content comprises on-demand content, live content, live linear content, or broadcast content.

16. The device of claim 13, wherein the manifest data represent a full duration of the media content.

17. The device of claim 13, wherein the one or more processors are configured to provide the manifest data to the media player as portions of the manifest data in a sequence of separate communications.

18. The device of claim 13, wherein each of the media segments of the media content corresponds to one of a plurality of bitrate variants of the media content, and wherein multiple bitrate variants are represented in the manifest data.

19. The device of claim 13, wherein the media segments include video segments and audio segments, and wherein at least some of the references to the audio segments refer to audio segments from which one or more audio frames have been removed.

20. The device of claim 13, wherein the one or more processors are further configured to skip one or more of the media segments during playback of the media content if a client playhead associated with the device falls behind a live playhead associated with the media content more than a threshold amount.

* * * * *